Sept. 12, 1972  F. J. DI FRANK ET AL  3,690,981
PROCESS FOR THE MANUFACTURE OF LAMINATED ARTICLE
Filed March 2, 1970  3 Sheets-Sheet 1

INVENTOR:
FRANK J. DIFRANK
BY GLENN W. MAZE
Paul L. Salvatore
David T. Immo
R.F. Rywalski & E.J. Holler
ATTORNEYS

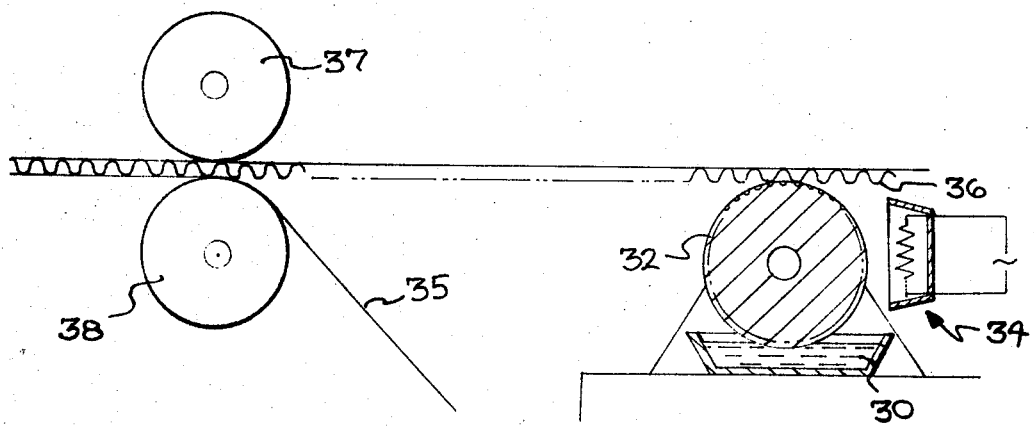
FIG. 3
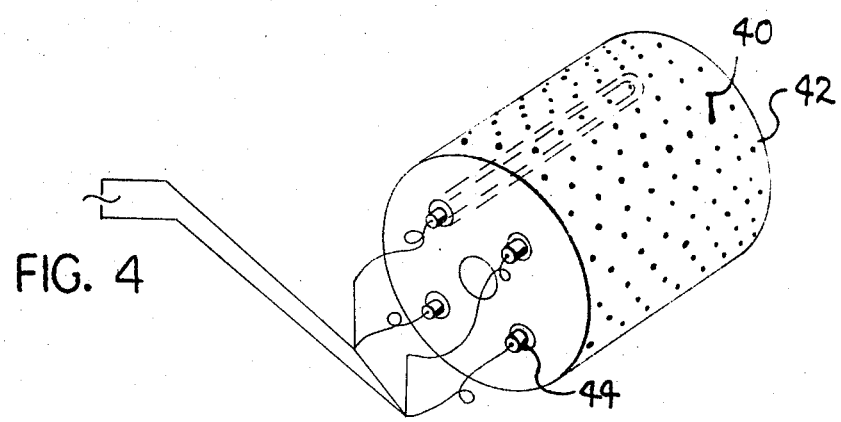
FIG. 4
FIG. 5
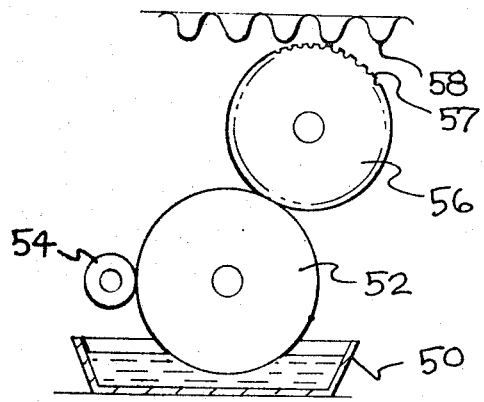

United States Patent Office 3,690,981
Patented Sept. 12, 1972

3,690,981
PROCESS FOR THE MANUFACTURE OF
LAMINATED ARTICLE
Frank J. Di Frank and Glenn W. Maze, Toledo, Ohio,
assignors to Owens-Illinois, Inc.
Filed Mar. 2, 1970, Ser. No. 15,688
Int. Cl. B31f 1/20; C09j 3/02
U.S. Cl. 156—210                                3 Claims

ABSTRACT OF THE DISCLOSURE

A novel process for the fabrication of a laminated article of manufacture wherein raw starch adhesive solution is first converted to a partially gelatinized starch, secondly, the just prepared partially gelatinized starch is applied to a receptive substrate before it and at least one lamina is brought together in bonding position, and then the partially gelatinized starch is essentially substantially gelatinized to produce the desired laminated article of manufacture.

BACKGROUND OF THE INVENTION

The present invention relates generally to a novel process for treating adhesives and to the use of the treated adhesives for intimately uniting both like and unlike surfaces to form an article of manufacture. More particularly, the subject invention pertains to both a new and uniform controlled method for preconditioning adhesives prior to their application to any predetermined substrate and to a new method for uniformly applying the preconditioned adhesives to the substrate. Specifically, the invention concerns both a method for producing partially gelatinized carbohydrate adhesives of the starch type and to a method for bonding together two or more surfaces with the partially gelatinized adhesive by directly applying said partially gelatinized product to at least one of the bondable surfaces and bonding another surface to the applied adhesive surface.

Adhesives, generally of the starch, starch derived types and starch base compositions modified with chemical additives, are widely employed for the manufacture of paper and paperboard type items of commerce and industry. These starch adhesives are used by paper manufacturers for the fabrication of a wide variety of paper products such as bags, boxes, cartons, fiber cans, paper laminates, paper labels, paper tubes, corrugated board and the like. The latter product, corrugated paperboard, commercially available from the corrugated paperboard manufacturer, is made in various forms, such as single-faced corrugated paperboard, double-faced, triple-faced, corrugated paperboard and the like. Single-faced corrugated paperboard consists of one flat sheet of paper intimately bonded by an adhesive to the flute tips of a sheet of corrugated paperboard. In the manufacture of double-faced corrugated paperboard, a second sheet of paper, termed a liner, is intimately bonded to the opposite flute tips of the corrugated sheet. Triple-faced board is then made by bonding another single-faced board to double-faced board, resulting in a paperboard made up of a sheet of liner sheet separating two corrugated sheets, with liner sheets bonded to the two, outside surfaces of the corrugated sheets.

The manufacturing process that is art employed for making the above described single-faced and double-faced corrugated paperboard can be accomplished by first passing paperboard between two heated, fluted, metal rolls to form the corrugated or fluted paperboard. After the fluting or corrugation of the paperboard, a facing or paperboard liner is adhesively glued to the corrugated tip to encase the corrugated paperboard on one or both sides with a liner of paperboard. The liner is finally bonded to the fluted tips by passing the assembled encased corrugated board over steam heated hot plates to set the glue and then the assembled corrugated board is cut to the desired, predetermined size.

In the prior art method for making single-faced and double-faced corrugated paperboards, as just described supra, various techniques have been tried for applying the adhesive, usually an aqueous starch composition, to the corrugated tips. One prior art method using what is termed a "double backer," involves the application of uncooked or raw starch to the corrugated tips, then bringing the liner into contact with the uncooked starch coated tips with a subsequent application of high and prolonged temperature and pressure to effect a complete gelatinization of the uncooked starch adhesive at the corrugated tip, linerboard interface. This just described method has the inherent disadvantages of requiring a large heat input in the "double backer" for evaporating the aqueous medium from the starch solution and for causing totally gelatinizing of the ungelatinized starch to produce an acceptable adhesive result. This method is often economically costly because it requires the use of large quantities of energy mainly in the form of heat and because of the production speed requirements demanding the use of large and intricate double backer machines. Another recently introduced method relating to the manufacture of corrugated board calls for applying raw or completely ungelatinized starch to the corrugated tips and then effecting gelatinization of the starch by the necessary step of steam heating or chemically treating the ungelatinized starch on the flutes. After the ungelatinized starch is gelatinized on the flutes, the liner is contacted therewith and the corrugated linerboard assembly was then passed through a double backer machine. This just stated process, in addition to demanding the continued use of a large double backer, also introduces steam heat into the adhesive process which could lead to the presence of excess moisture and a subsequent warping of the corrugated linerboard assembly. Yet still other prior art methods for applying starch adhesives have been tried with either no avail or with unacceptable results. For example, some of those methods involved the heating of starch compositions in bulky storage tanks with the use of excess heat and resulted in the production of lumpy starch adhesive, while other methods employed the heating of a starch pan located under an applicator roll with an eventual change in the viscosity of the starch and the formation of undesirable starch lumps which was usually attributed to the constant heating of the pan. Yet other prior art techniques comprised the heating of the paper contacting substrates and the like. The main difficulties with these above mentioned prior art methods was that they generally reacted on the complete batch of starch causing gelatinization of the batch which made it virtually imposible to apply the starch to the flutes, or the methods permitted gelatinized starch to become mixed with ungelatinized starch producing thereby an unworkable starchy adhesive consisting of random viscosity and lumpy consistency, or the system used excessive heat, steam and the like for a resultant economically unfeasible and commercially unsatisfactory process of manufacture.

Thus, in the light of the immedaite presentation of the prior art, it becomes a primary purpose of the present invention to make available to the corrugated paperboard art a novel and unobvious method for successfully manufacturing corrugated board that is essentially free of the difficulties associated with the prior art.

Yet another purpose of this invention is to provide a method for applying partially gelatinized starch adhesives and partially gelatinized starch like adhesives to corrugated tips.

Still yet a further purpose of the present invention is to make available to the art a uniform, controlled method for preconditioning starch adhesives prior to their application to any preselected substrate.

Yet another purpose of the subject invention is to apply heat to the desired starch adhesive just prior to its application to a joinable substrate, generally fluted paperboard, to bring the starch to a point of partial gelatinization and then transfer the partially gelatinized starch to a receptive substrate.

Still yet a further purpose of the invention is to intimately contact a naturally occurring or chemical gelatinizing agent to a starch or modified starch to produce, either alone or incombination with heat, a partial gelatinization of the starch granules just immediately prior to the starch's application to corrugated flutes for subsequent bonding to a linerboard and for final or essentially complete gelatinization.

These and other features, objects and advantages of the present invention will become more readily apparent from the following description taken in conjunction with the accompanying drawings and claims.

SUMMARY OF THE INVENTION

The invention concerns corrugated paperboard flute tips having thereon partially gelatinized or further gelatinizable adhesive starch or the like. The invention also concerns novel techniques for preconditioning starch adhesive and starch adhesive derivatives just prior to the application of the adhesives to corrugated tips for the fabrication of corrugated board. The mode and manner of performing the invention consists essentially of making partially gelatinized or further gelatinizable starch adhesives by treating the raw starch with heat or with a gelatinizing agent immediately before the partially gelatinized product is transferred to or applied to paperboard corrugated tips. After the tips are coated with the further gelatinizable starch composition of matter, a sheet of linerboard or lamina is brought into contact with the starch covered tips and the corrugated linerboard assembly is subjected to heat and pressure in a double backer machine or in an oven to essentially complete the gelatinization of the starch and to firmly bond the fluted tips to the linerboard.

BRIEF DESCRIPTION OF THE DRAWINGS

FIG. 3 is a schematic view of another embodiment of the invention illustrating the use of a radiant heater for preconditioning the starch adhesive on the transfer roll.

FIG. 4 is a schematic view of a further embodiment of the invention illustrating the use of a heated adhesive transfer applicator roll that has an internal source of radiant heat.

FIG. 5 is another embodiment of the invention illustrating an off-set adhesive applicator assembly with a first transfer roll gathering the adhesive from the adhesive pan and transferring the adhesive to a second heated roll for application to the tips of a corrugated medium.

DETAILED DESCRIPTION OF THE DRAWINGS AND THE INVENTION

Figure 1:
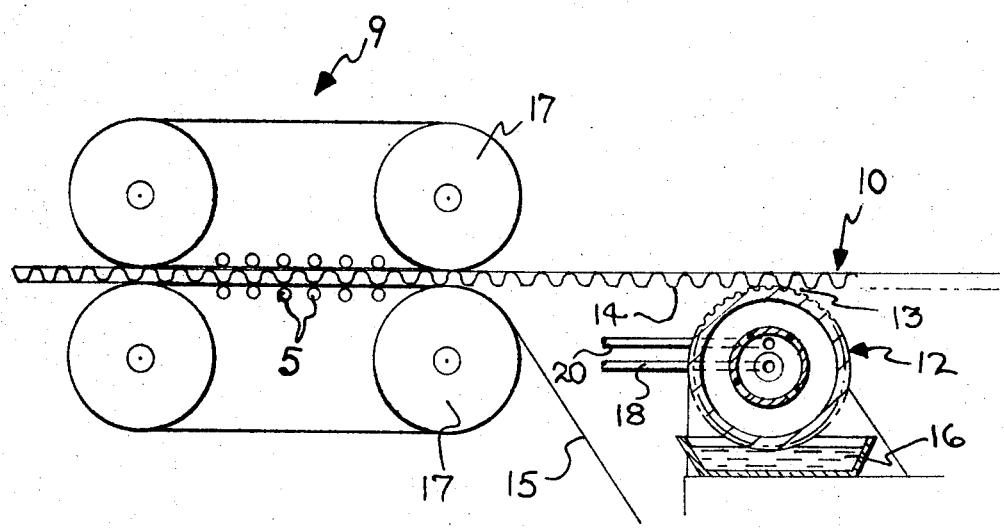
FIG. 1 is a schematic, cross-sectional view illustrating a fluid heated transfer roll applying starch adhesive to the flutes of a single-faced corrugated medium.
Figure 6:
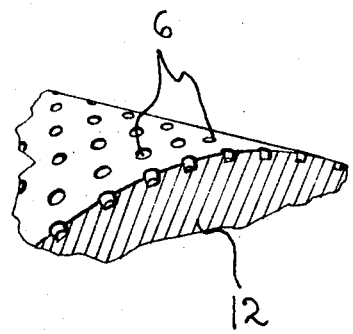
FIG. 6 is a perspective view, on an enlarged scale, illustrating the surface configuration of the glue roll which applies the adhesive to the paper medium.

Turning now in detail to the drawings, FIG. 1 represents one example of applying partially gelatinized starch adhesives to the flute tips of single-faced, corrugated board. As seen in FIG. 1, a web of a single-faced corrugated board 10 is moved over an adhesive applicator roll 12 with the tips 14 of the corrugated board 10 in contact with the roll. The applicator roll is heated to a predetermined desired temperature by circulating a fluid, usually heated water, or steam through the roll 12 by means of fluid inlet and fluid outlet conducts 18 and 20. The surface of the applicator roll 12 is of the conventional gravure type, that is, it has cells, pockets or depressions etched in or otherwise formed below the surface of roll 12. These pockets function to transport the adhesive starch, from a pan 16 containing the starch solution to tips 14. The roll 12 may have a surface configuration as specifically illustrated in FIG. 6, it being understood that other, functionally equivalent, applicator roll surfaces may also be used in the present invention. In FIG. 6, it can be seen that the roll surface is formed with a plurality of depressions 6 which act as tiny reservoirs for conveying adhesive from the adhesive pan 16 to flute tips 14. Thus, in actual operation raw or uncooked starch of cereal and sources like starches of the corn, potato, tapioca flour, arrowroot flour or the like type, or starch degradation products, oxidized starches, proteolytically or enzymatically treated starches, that is, starches and starch products that can be partially gelatinized and then essentially completely gelatinized to produce good adhesive properties, is mixed with a liquid carrier, generally water and poured into adhesive pan 16 for pick-up by the heated starch transfer applicator roll 12 containing depressions 6 for applying starch to flute tips 14.

The starch liquid mixture in the adhesive pan may be modified if desired to lower the partial gel and complete gel point of the starch by the addition of chemical agents, usually caustic alkali such as sodium hydroxide, potassium hydroxide or the like to the starch liquid mixture.

In the unheated condition, the starches generally lack any adhesive qualities; but at elevated temperatures of about 135° F. to about 147° F., the starch is partially gelatinized and, when it is partially gelatinized, it possesses adhesive qualities, complete or total gelatinization occurring at about 145° F. to 170° F. Generally, starch formulations that may be used for the purpose of the invention consist of about 20% to about 45% of raw or uncooked starch suspended or mixed with a liquid carrier like water. A typical representative starch suitable for the performance of this invention may consist essentially of 430 gallons of water, 1100 pounds of starch and 5.4 gallons of caustic. The raw starch adhesive used herein is a commercially available product termed "corrugating starch" and it is marketed by the Corn Products Company. This product consists essentially of corn starch; however, as noted supra, other starches are within the purview of the art. The partial gelatinization temperature range of this commercially available ungelatinized starch is about 145° F. to about 147° F. The essentially complete gelatinization temperature of this starch adhesive is within the temperature range of about 147° F. to about 155° F.

Turning again to FIG. 1, in operation then, heated water is pumped into and out of applicator 12 through inlet and outlet conduits 18 and 20. The heated water supplies the necessary heat to the raw starch confined in the pockets of the applicator roll to bring it to its partial gelatinization point. The temperature of the heated water circulating in the applicator roll is about 140° F. to 170° F., to effect sufficient heat transfer to the starch in the pockets, and at this circulating heat temperature range the starch which is carried in the gravure pockets of the applicator roll, in very thin, minute portions, is substantially, instantaneously, partially gelatinized at its temperature range of 145° F. to 147° F. with an evaporation of part of the aqueous carrier. The partially gelatinized starch is held on the applicator roll by the gravure pockets and this partially gelatinized starch is next transferred to the flute tips 14 as they pass over the applicator roll 12. The use of the gravure surfaced applicator roll prevents contamination of the uncooked starch in the adhesive pan by avoiding mixing partially gelatinized starch with the raw starch because the partially gelatinized starch in the pockets of the applicator roll that is not transferred to the flute tips on the first rotation of the roll, is retaine din the gravure pockets for use on subsequent roll turns and does not become mixed with the starch in the adhesive pan.

The partially gelatinized starch is about 0.005 to 0.010 inches thick in the pockets of the applicator roll. At the elevated, partial gelatinization, temperature, a portion of the water carrier is removed causing a greater swelling of the starch molecule and when it is transferred there is a quicker penetration of the starch system at the mating corrugated substrates. Complete gelatinization finally occurs in the "double backer" after the linerboard has been applied to the flute tips which were coated with the partially gelatinized starch. In this process, the apparatus for applying the liner may comprise a pair of entrance guide rolls 17 of the schematically shown "double backer" 9 which engage the single-faced corrugated board 10 along its upper surface and position the board so that it can come into intimate contact with a sheet of paper 15 to form the other liner of the final product. The sheet of paper 15 is supplied from a supply roll (not shown) and it is brought into bonding contact position at the entrance rolls 17 wherein the coated portions of the corrugated single-faced board 10 is pressed against the sheet 15 so that the two members are caused to be united. The corrugated single-faced board and the liner united thereto now pass into the double backer 9 where heat is applied by heating elements (not shown) associated the pressure rolls 5 for the purpose of converting the partially gelatinized adhesive starch to a totally gelatinized state.

The novel and unobvious employment of the partial gelatinized starch adhesive composition of this invention reduces the need for prolonged and high heat requirements at the double backer stage because the maximum heat input has been introduced at the applicator roll with a major reduction of the heat requirement to finally gel and set up the bond between the flute tips and the liner. When starch gels, it must lose the water around each granule of starch before it will set up or completely gelatinize. In the present invention some of the water present is lost during the partial gelatinization step and some of the water present is lost from the starch adhesive by being absorbed in the corrugated media and by the liner media. The corrugated media and the liner media absorb the water fastest in the "double backer" wherein the temperature is maintained at between 200° F. and 300° F. This invention, by removing some of the water prior to the final assembly of the corrugated liner board reduces the amount of water the various media must absorb and thus permits the use of a shortened length, double backer.

The employment of the partial gelatinized starch adhesive compositions of this invention enables the operating of the corrugating machine over a wide rang of speeds with a successful bonding of linerboard to the adhesive coated corrugated tips. The partially gelatinized starch, also referred to as further gelatinizable starch adhesive compositions, can be used for making single-faced, double-faced corrugated paperboard or the like at machine speeds as low as 50 feet and as high as about 700 feet of corrugated paperboard finished product per minute. The partially gelatinized starch adhesive compositions evidence good wet-tack and very good bonding strength as do the completely gelatinized starch of this invention. The corrugated paperboard product formed by using partially gelatinized starch which was completely gelatinized on the corrugated paperboard machine, produced a product that consumed less starch and retained less moisture in its manufacture which are further evidence of the unobvious accomplishments and productive advantages that flow from the use of this invention.

Figure 2:
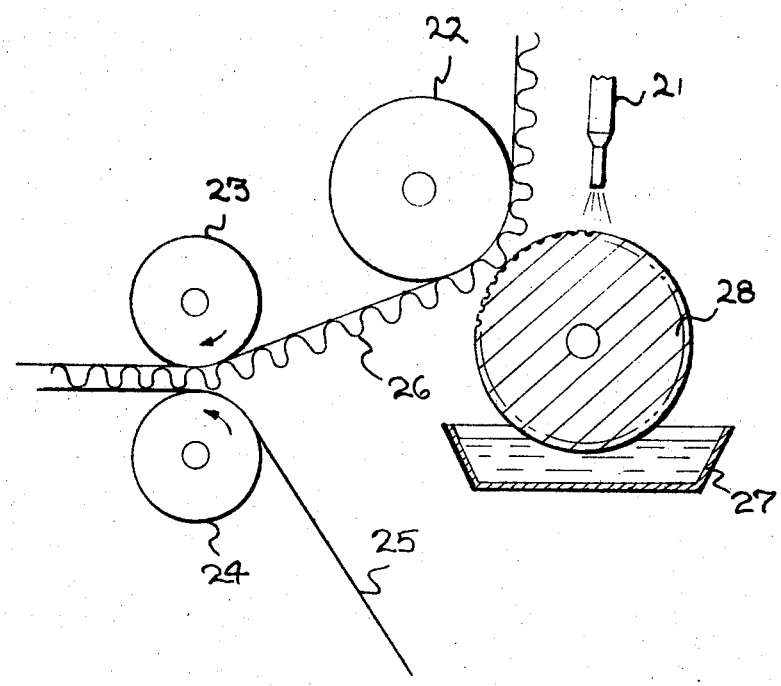
FIG. 2 is a schematic cross-sectional view similar to FIG. 1 illustrating a second embodiment of the invention wherein chemical conditioning of the starch adhesive is carried out on the transfer roll.

FIG. 2 sets forth another embodiment of the invention by illustrating a combination heated and chemical process for treating the starch. In this process, raw starch in pan 27 is transferred by heated, pocketed, applicator roll 28, incorporating a suitable heating means not shown, to flute tips 26. Here again, for illustrative purposes the flute tips are shown as those of a single-faced medium. As the starch filled pockets pass out of pan 27 they pass through a spray provided by spray nozzle 21 and the heated starch is chemically sprayed with a gel point depressing chemical such as a caustic soda or the like onto the rotating applicator in a quantity sufficient to reduce the gel point to give a combination heated gel point, lowered, partially gelatinized starch. The partially gelatinized starch is transferred from the gravure roll to the flute tips for manufacture into a corrugated product. Guide roll 22 positions the flute tips against the applicator roll 28 and as the treated paper moves into a double backer, guide rolls 23 and 24 bring the flute tips and a liner 25 into bonding position for final gelatinization in the double backer.

Another means for performing the invention is illustrated by FIG. 3. In this inventive embodiment, the starch contained in a starch reservoir pan 30 is picked up by the pockets of a rotating applicator roll 32 and passes through a radiant heat zone created by a radiant heater 34. The temperature of the radiant heated zone is about 140° F. to 170° F. depending upon starch heat absorption for the respective starch, with the starches turning cloudy or slightly grayish in color at the partial gelatinization temperature range of about 135° F. to 147° F. as present in the gravure pockets on the applicator roll, and, as the starch carried in the pockets of the applicator roll passes through the heated zone it is partially gelatinized for transfer to the corrugated flute tips 36. The flute tips, covered with the partially gelatinized starch, is next passed into a conventional double backer, not shown, through guide rolls 37 and 38 where a linerboard 35 is brought into contact with flute tips 36 for further heat application, final gelatinization, and final bonding to produce the corrugated board product.

FIG. 4 illustrates another means for heating the starch in the pockets 40 in the surface of an applicator roll 42. The rotatable applicator roll is heated to the desired temperature for partially gelatinizing the starch by the use of Cal-rod type heaters 44 axially extending through the length of the applicator roll. The temperature produced by the Cal-rod type heaters can be regulated by a thermostat or the like to effect the necessary temperature control for producing partially gelatinized starch in the pockets of the applicator roll. After the raw starch is partially gelatinized it is transferred to corrugated tips and the bonding of a liner to the tip is as described in FIG. 1 through FIG. 3 above.

With reference to FIG. 5, an off-set method is illustrated for applying further gelatinizable or partially gelatinized starch to corrugated flute tips. The raw starch in starch pan 50 is first coated onto rotating roll 52. A doctor roll 54 monitors the amount of uncooked starch adhering to the surface of roll 52. Next, the raw starch is transferred to gravure roll 56 where the pockets 57 carry the starch. The starch on roll 56 may be heated by one of the heating techniques described above, to the partial gelatinization temperature of about 140° F. to about 145° F. or slightly higher depending on the starch, for example, corn starch has a partial gelatinization range of about 145° F. to 147° F. The partially gelatinized starch is next brought into contact with flute tips 58. The coated tips, with the partially gelatinized starch firmly mated thereto are then fed into a double backer for application of the linerboard and complete gelatinization of the partially gelatinized starch occurs in the double backer.

The sunken or depressed surfaces, pockets or cups of a typical commercially available gravure roll used for heating the raw starch to partial gelatinization is diagrammatically illustrated by FIG. 6. These depressed surfaces, or cups, also conveniently referred to as pockets, indentures or the like may have depth and area of depressed area varying depending on the quantity of starch which it is desired to apply to the flute tips. In operation, employing a commercially available gravure roll, the thickness of the raw starch on the surface of the transfer gravure roll may be controlled in a well known manner by a doctor blade, a doctor roll, or the like. The cells or depressions are depth etched into the surface of the gravure roll by art known techniques to produce a surface containing a plurality of isolated pockets 6. The raw starch picked up by these pockets is, on the application of heat, partially gelatinized and then transferred to the flute tips of a corrugated web. The starch that is not transferred on the first rotation of the transfer roll is retained in the pocket for transfer on the second or subsequent rotations and transfer to the fluted tip. The utilization of pocket or the like for transfer of the heated partially gelatinized starch to the tips, essentially eliminates any possible contamination of the starch in the pan due to mixing with the raw starch of small partially gelatinized globules of heated starch.

Figure 7:
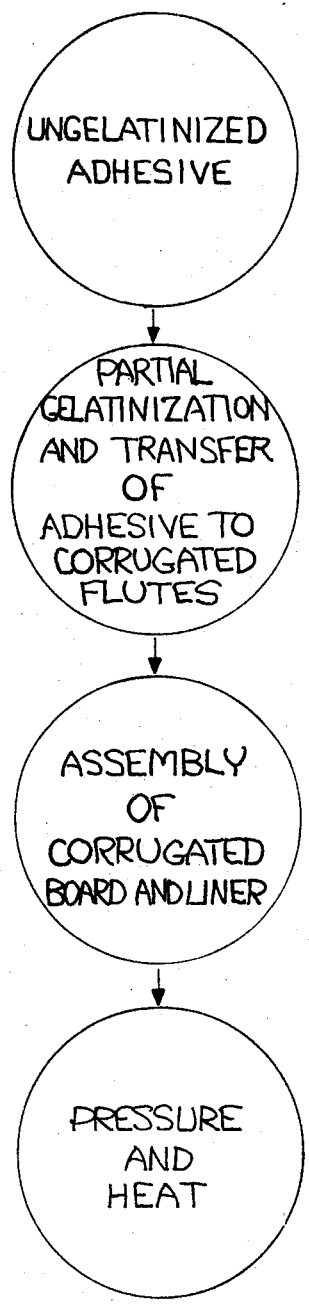
FIG. 7 is a block diagram of the method steps of the invention.

The process steps used in accordance with this invention are referred to in the process diagram of FIG. 7, wherein it will be seen that the process consists of the steps of taking ungelatinized starch suspended in a liquid carrier, partially gelatinizing the starch by heating it and/or chemically treating it to eliminate some of the liquid carrier, next transferring the partially gelatinized starch adhesive to a corrugated flute tip substrate for coating of the tips, then the bonding of the coated tips to a linerboard or other suitable substrate and finally applying heat and pressure in a double backer to produce the assembled corrugated product.

The present invention can also be used for the manufacture of other products where the application of starch adhesive is desired. For example, rotary brushes, moving in contact with the applicator roll, could dip into the pockets of the roll and then brush the partially gelatinized starch onto a moving flat paper surface for adhesively bonding another flat paper surface thereto. Thus, it can be seen that the present invention has utility in any situation where it is desirable to use starch adhesives for bonding of paper to paper wherein the adhesive system is of the type where gelatinization of starch is a factor. Therefore, it will be obvious to those skilled in the art from a reading of the disclosure that the invention will find many other applications and it is intended that these other applications and embodiments are within the scope of this invention.

We claim:
1. A method for the manufacture of a laminated, corrugated paperboard wherein said method comprises the steps of:
   (a) heating an applicator roll to a temperature sufficient to partially gelatinize a starch adhesive;
   (b) exposing the applicator roll to a raw adhesive, which is an ungelatinized starch;
   (c) heating at least a portion of the starch to its gelatinization temperature while being carried on the roll;
   (d) contacting the partially gelatinized starch adhesive to the flute tips of a corrugated medium;
   (e) joining a liner to the starch covered flute tips; and then
   (f) continuing heating the joined corrugated board and liner to bond the liner to the corrugated medium.

2. The method of claim 1 wherein the gel point of the starch adhesive is lowered by the addition of a gel point lowering reagent.

3. The method for the manufacture of corrugated paperboard according to claim 2, wherein the gel point lowering reagent is a caustic soda solution.

References Cited
UNITED STATES PATENTS

| | | | |
|---|---|---|---|
| 2,824,037 | 2/1958 | King | 156—336 |
| 3,434,901 | 3/1969 | Griffiths et al. | 156—210 |
| 2,610,136 | 9/1952 | Casey et al. | 106—213 X |
| 2,886,541 | 5/1959 | Langlois et al. | 156—210 X |
| 2,102,937 | 12/1937 | Bauer | 156—210 X |

WILLIAM A. POWELL, Primary Examiner

U.S. Cl. X.R.

156—208, 336; 161—137, 268, 270